(12) United States Patent
Downing

(10) Patent No.: US 11,391,957 B2
(45) Date of Patent: Jul. 19, 2022

(54) EMBEDDED TRANSMISSIVE DIFFRACTIVE OPTICAL ELEMENTS

(71) Applicant: STMicroelectronics (Research & Development) Limited, Marlow (GB)

(72) Inventor: James Peter Drummond Downing, Doune (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 778 days.

(21) Appl. No.: 16/173,495

(22) Filed: Oct. 29, 2018

(65) Prior Publication Data

US 2020/0133014 A1    Apr. 30, 2020

(51) Int. Cl.
| | |
|---|---|
| *G02B 27/09* | (2006.01) |
| *G02B 1/11* | (2015.01) |
| *G02B 1/113* | (2015.01) |
| *G02B 1/115* | (2015.01) |
| *G02B 1/118* | (2015.01) |

(52) U.S. Cl.
CPC ............ *G02B 27/0955* (2013.01); *G02B 1/11* (2013.01); *G02B 1/113* (2013.01); *G02B 1/115* (2013.01); *G02B 1/118* (2013.01); *G02B 27/09* (2013.01); *G02B 27/0944* (2013.01); *G02B 27/0961* (2013.01)

(58) Field of Classification Search
CPC ...... G02B 27/0955; G02B 1/11; G02B 27/09; G02B 27/0944; G02B 27/0961; G02B 1/113; G02B 1/115; G02B 1/118
See application file for complete search history.

(56) References Cited

U.S. PATENT DOCUMENTS

| | | | |
|---|---|---|---|
| 5,074,629 A | 12/1991 | Zdeblick | |
| 5,119,231 A | 6/1992 | Nelson et al. | |
| 6,157,488 A | 12/2000 | Ishii | |
| 6,545,821 B2 | 4/2003 | Katsuma | |
| 6,741,394 B1 * | 5/2004 | Tanitsu | ................ B41M 5/5272 359/619 |
| 6,762,880 B2 | 7/2004 | Holm et al. | |
| 7,656,585 B1 | 2/2010 | Powell et al. | |
| 7,670,758 B2 | 3/2010 | Wang et al. | |
| 8,270,079 B1 | 9/2012 | Mossberg et al. | |

(Continued)

FOREIGN PATENT DOCUMENTS

| | | |
|---|---|---|
| EP | 2 487 718 A2 | 8/2012 |
| EP | 2 492 716 A1 | 8/2012 |

*Primary Examiner* — Evelyn A Lester
(74) *Attorney, Agent, or Firm* — Seed IP Law Group LLP

(57) ABSTRACT

Various embodiments provide optical lenses that include phase shift layers that transmit incident light with four or more distinct phase quantizations. In one embodiment, a lens includes a substrate, a first immersion material layer on the substrate, and a plurality of anti-reflective phase shift layers on the first immersion material layer. The phase shift layers define a first anti-reflective phase shift region that transmits received light without a phase shift, a second anti-reflective phase shift region configured to transmit the received light with a first phase shift, a third anti-reflective phase shift region configured to transmit the received light with a second phase shift, and a fourth anti-reflective phase shift region configured to transmit the received light with a third phase shift. The first, second, and third phase shifts are different from one another.

18 Claims, 8 Drawing Sheets

(56) References Cited

U.S. PATENT DOCUMENTS

| | | |
|---|---|---|
| 8,723,768 B2 | 5/2014 | Egi et al. |
| 9,511,553 B2 | 12/2016 | Ozaki et al. |
| 11,187,837 B2 | 11/2021 | Channon et al. |
| 2005/0274871 A1 | 12/2005 | Li et al. |
| 2008/0136956 A1 | 6/2008 | Morris et al. |
| 2008/0311530 A1* | 12/2008 | Allen .................... G03F 7/2041 430/327 |
| 2009/0111056 A1* | 4/2009 | Hendel ................ G03F 7/2022 430/296 |
| 2009/0117491 A1* | 5/2009 | Hendel .................. G03F 7/203 430/296 |
| 2009/0134483 A1 | 5/2009 | Weng et al. |
| 2010/0020400 A1 | 1/2010 | Amako |
| 2011/0080572 A1 | 4/2011 | Kelkar |
| 2012/0140197 A1 | 6/2012 | Bakker |
| 2012/0219755 A1* | 8/2012 | Bae ........................ G03F 7/094 428/141 |
| 2013/0028589 A1 | 1/2013 | Zung et al. |
| 2013/0074774 A1* | 3/2013 | Liu ......................... C23C 16/46 118/725 |
| 2014/0001590 A1 | 1/2014 | Liu et al. |
| 2015/0029588 A1 | 1/2015 | Fiorentino et al. |
| 2015/0185617 A1* | 7/2015 | Markle ............... G03F 7/70466 430/269 |
| 2018/0143359 A1* | 5/2018 | Chan .................... G02B 5/1866 |
| 2019/0120999 A1* | 4/2019 | Iazikov ................ G02B 5/3083 |

* cited by examiner

EMBEDDED TRANSMISSIVE DIFFRACTIVE OPTICAL ELEMENTS

BACKGROUND

Technical Field

The present disclosure is directed to wafer level optical lenses, and more particularly, to such optical lenses having one or more phase shift layers that transmit incident light through the lens with a plurality of distinct phase quantizations.

Description of the Related Art

Diffractive optical lenses, sometimes referred to as diffractive optical elements, are commonly used to modulate light by diffraction. For example, a diffractive optical lens may be used to alter and split light that is propagated through the lens. A diffractive optical lens is typically made of a single material, such as glass, and includes a plurality of diffractive microstructures patterned directly in to a surface of the material.

A function of the diffractive microstructures of the diffractive optical lens is dependent on a refractive index of a material used to form the microstructures and a refractive index of an environment in which the microstructure exists, such as air. The dimensions, such as the height and width, of the diffractive microstructures may be customized according to the application. A size (i.e., aspect ratio) of the diffractive microstructures is dependent on a difference between the refractive index change of the material of the microstructures and the refractive index of the environment, i.e. where the microstructures are immersed.

As current diffractive optical lenses are typically made of a single material and the refractive index of air remains relatively constant, adjusting the refractive index change of air immersed diffractive optical lenses is typically limited to altering the material used for the lens. In addition, air immersed diffractive optical lenses do not provide a planar external surface because of the various heights and widths of the diffractive microstructures. Consequently, current diffractive optical lenses are not readily compatible with wafer-to-wafer bonding techniques or direct application of coatings, such as anti-reflective coatings.

Immersing a diffractive optical lens in another material of different refractive index to the diffractive structures allows an extra degree of design freedom and embeds the diffractive optical lens within the optical chip. This facilitates coating external surfaces and allows wafer to wafer bonding. Embedded diffractive optical lenses are generally limited in terms of a number of phase quantizations that are imparted on transmitted light and/or in terms of anti-reflective properties. For example, embedded diffractive optical lenses that are anti-reflective may be limited to a binary diffractive profile, i.e., with only two distinct phase quantizations being imparted on light transmitted through such lenses.

BRIEF SUMMARY

The present disclosure is directed to transmissive diffractive optical elements or lenses that are embedded in a semiconductor wafer or formed on a glass substrate. Such lenses may include a plurality of phase shift layers which have anti-reflective and diffractive properties. In some embodiments, the diffractive properties may include transmission of a plurality of different phase quantizations of light. In terms of anti-reflective properties, the lenses may be formed so that reflections at one or more interfaces between material layers will destructively interfere, thereby reducing or eliminating reflections.

In one or more embodiments, the present disclosure provides a lens that includes a substrate, a first immersion material layer on the substrate, and a plurality of anti-reflective phase shift layers on the first immersion material layer. The phase shift layers define: a first anti-reflective phase shift region configured to transmit received light without a phase shift; a second anti-reflective phase shift region configured to transmit the received light with a first phase shift; a third anti-reflective phase shift region configured to transmit the received light with a second phase shift; and a fourth anti-reflective phase shift region configured to transmit the received light with a third phase shift. The first, second, and third phase shifts are different from one another.

In another embodiment, the present disclosure provides a lens that includes an immersion material layer having opposite first and second surfaces, and a plurality of anti-reflective phase shift layers embedded in the immersion material layer between the first and second surfaces. Portions of the immersion material layer extend between adjacent ones of the plurality of anti-reflective phase shift layers. The lens includes a first anti-reflective phase shift region configured to transmit received light without a phase shift, a second anti-reflective phase shift region configured to transmit the received light with a first phase shift, a third anti-reflective phase shift region configured to transmit the received light with a second phase shift, and a fourth anti-reflective phase shift region configured to transmit the received light with a third phase shift. The first, second, third, and fourth phase shifts are different from one another.

In yet another embodiment, the present disclosure provides a lens that includes a substrate, a first immersion material layer on the substrate, a first anti-reflective layer on the first immersion layer, a second anti-reflective layer, a second immersion material layer on the second anti-reflective layer, and a phase shift layer between the first and second anti-reflective layers. The phase shift layer includes a plurality of portions of a first material, and a plurality of portions of a second material. At least two of the portions of the first material have different widths, and at least two of the portions of the second material have different widths. The portions of the first and second materials are alternately disposed in a width direction of the phase shift layer.

DETAILED DESCRIPTION

Figure 1A:
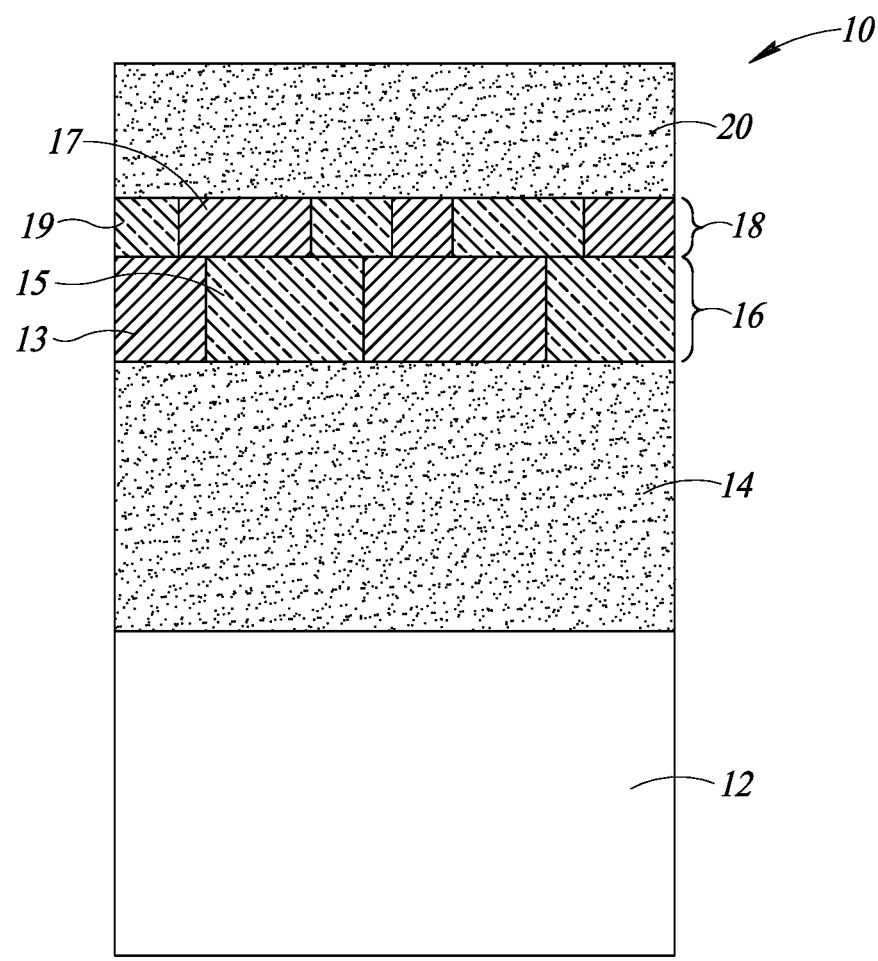
FIG. 1A is a cross-sectional view of an optical lens, in accordance with one or more embodiments of the present disclosure.

In the following description, certain specific details are set forth in order to provide a thorough understanding of various embodiments of the disclosure. However, one skilled in the art will understand that the disclosure may be practiced without these specific details. In some instances, well-known details associated with semiconductors, integrated circuits, and optical lenses have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Diffractive optical lenses may be used for a variety of different devices, including optical telecommunication devices, cameras, and optical sensors. The lenses may be used for beam splitting. Diffractive optical lenses can also be included in time-of-flight sensors.

FIG. 1A is a cross-sectional view of an optical lens 10, which may be an embedded diffractive optical element, in accordance with one or more embodiments of the present disclosure. The lens 10 includes a substrate 12, a first immersion material layer 14, a first phase shift layer 16, a second phase shift layer 18, and a second immersion material layer 20.

The first phase shift layer 16 includes two or more different materials, each of which causes incident light to be transmitted with a particular phase shift with respect to the incident light. For example, the first phase shift layer 16 may include a first material 13 that produces a 0-phase shift (i.e., no effective phase shift in the transmitted light), and a second material 15 that produces a π-phase shift. Thus, light that is incident on the first phase shift layer 16 is transmitted with either a 0-phase shift or a π-phase shift, depending on which of the first or second materials 13, 15 the light is transmitted through. Accordingly, the first phase shift layer 16 may be referred to as a π-phase shift layer, which imparts either no phase shift or a π-phase shift on incident light, depending on which of the first or second materials 13, 15 the light is transmitted through.

The second phase shift layer 18 includes two or more different materials, each of which causes incident light to be transmitted with a particular phase shift. For example, the second phase shift layer 18 may include a third material 17 that produces a 0-phase shift (i.e., no effective phase shift in the transmitted light), and a fourth material 19 that produces a π/2-phase shift. Thus, light that is incident on the second phase shift layer 18 is transmitted with either a 0-phase shift or a π/2-phase shift, depending on which of the third or fourth materials 17, 19 the light is transmitted through. Accordingly, the second phase shift layer 18 may be referred to as a π/2-phase shift layer, which imparts either no phase shift or a π/2-phase shift on incident light.

Figure 1B:
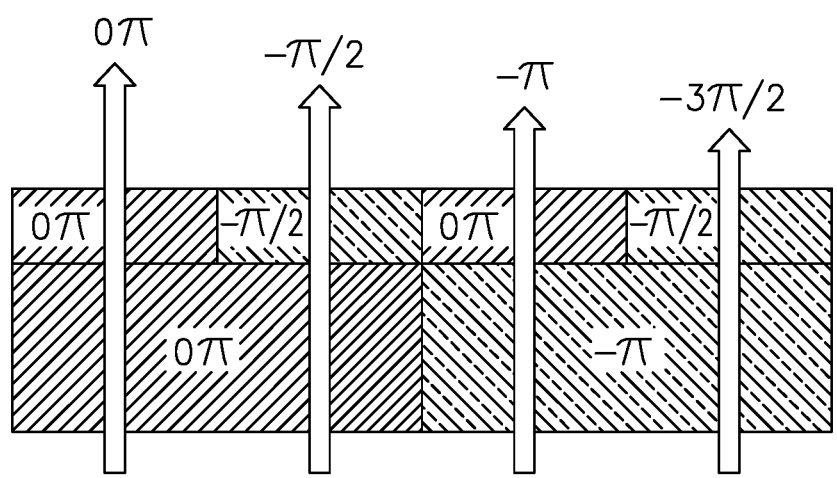
FIG. 1B is a cross-sectional view illustrating four different transmission phases that may be obtained via transmission of light through the optical lens shown in FIG. 1A.

FIG. 1B is a cross-section of an example optical lens that illustrates four different transmission phases (which may be referred to herein as "phase quantizations") that may be obtained via transmission of light through the first and second phase shift layers 16, 18 of the optical lens 10 shown in FIG. 1A. More particularly, as shown in FIG. 1A, light may be transmitted through either a 0-phase shift portion or a π-phase shift portion of the first phase shift layer 16, and through either a 0-phase shift portion or a π/2-phase shift portion of the second phase shift layer 18. Accordingly, light is transmitted through the optical lens 10 with four distinct phase quantizations, i.e., 0π, π/2, π, and 3π/2, as shown in the example of FIG. 1B. The phase shifts may be expressed as either positive or negative phase shifts, and in the example shown in FIG. 1B, the phase shifts are expressed as negative phase shifts, although embodiments of the present disclosure are not limited thereto.

In some embodiments, the first material 13 of the first phase shift layer 16 may be the same material as the third material 17 of the second phase shift layer 18. Moreover, the second material 15 of the first phase shift layer 16 may be the same material as the fourth material 19 of the second phase shift layer 18.

In one or more embodiments, the substrate 12 may be a glass substrate. The first and second immersion material layers 14, 20 may be oxide layers, such as silicon dioxide ($SiO_2$) layers. In some embodiments, the first and third materials 13, 17 are silicon nitride (SiN), and the second and fourth materials 15, 19 are silicon (Si). In some embodiments, the second and fourth materials 15, 19 are amorphous silicon.

The optical lens 10 may be designed to have anti-reflective and diffractive properties. For example, depending on a number of distinct phase quantizations (i.e., a number of different transmission phases, each having a different phase shift with respect to the incident light beam) desired, the optical properties of the first and second phase shift layers 16, 18, such as the refractive indices and dimensions of the first through fourth materials 13, 15, 17, 19 may be selected and/or designed to impart the desired phase quantizations, as well as to provide anti-reflective properties.

Figure 3:
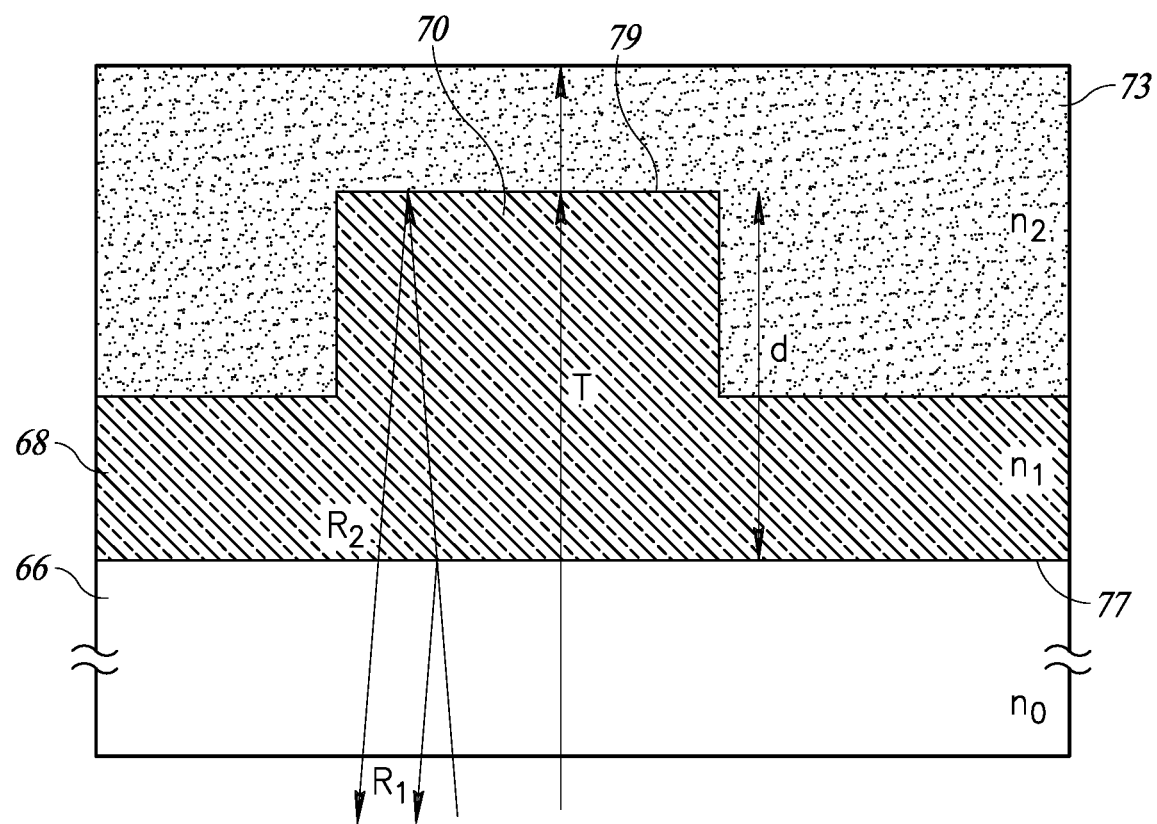
FIG. 3 is a cross-sectional view of an example diffractive optical lens for which the height of the diffractive microstructure is calculated to produce a desired phase shift and to have anti-reflective properties, according to one or more embodiments.

FIG. 3 is a cross-sectional view of an example diffractive optical lens for which the height of a diffractive microstructure is calculated to produce a desired phase shift and to have anti-reflective properties. FIG. 3 is described in pending U.S. patent application Ser. No. 15/357,837, filed Nov. 21, 2016, which application is owned by the same Applicant as the present application, and the entirety of which is incorporated herein by reference.

For example, with respect to FIG. 3, a first material having a first refractive index $n_1$ is identified for the diffractive microstructures and a second material (that may be air) is identified and has a second refractive index $n_2$. The second material is configured to surround or otherwise immerse the diffractive microstructures, such as a protective layer. In one embodiment, the first and second materials are selected based on their refractive indexes. For example, in one embodiment, the materials are selected such that the refractive index $n_1$ is not equal to the refractive index $n_2$.

Additionally, a total number of different levels N for the diffractive microstructures 70 is selected. The total number of levels N is the maximum number of different heights, or thicknesses, that the diffractive microstructures may have. FIG. 3 illustrates an embodiment having a total number of levels N equal to 2.

A height of each level N is calculated based on the refractive indexes $n_1$ and $n_2$ to be anti-reflective and to have a desired transmission phase for the target transmission wavelength $\lambda$. Namely, the height is calculated to generate the destructive interference to minimize reflections, and to transmit a phase delay to perform a desired diffractive function.

T is light that is transmitted through the substrate 66 and the diffractive microstructure, R1 is light that is reflected from the interface 77 between the substrate 66 and the diffractive microstructure, R2 is light that is reflected from the interface between the diffractive microstructure and the material, which may be air immersing the diffractive microstructure, and d is the height of the level being calculated. The height d is from the interface 77 to a top surface 79 of the microstructure. Additionally, it is noted that it may be desirable for the refractive index delta, or difference, between $n_0$ and $n_2$ to be minimized so that the magnitude of reflected light is equal from both bottom and top interfaces.

For the diffractive microstructure to be anti-reflective, the diffractive microstructure should have a height d such that $R_1$ destructively interferes with $R_2$. In order for $R_1$ and $R_2$ to destructively interfere with each other, the reflection phase of $R_2$ should satisfy equation 1, as follows:

$$\phi_{R_2} = p\pi \quad (1)$$

where p equals 0 or a multiple of 2 (i.e., 0, 2, 4, 6, 8, 10, . . . ).

The reflection phase of $R_2$ of a diffractive microstructure for a $k^{th}$ level of the levels N (e.g., k=0, 1, 2, or 3 for N=4) is defined by equation 2, as follows:

$$\phi_{R_2} = \frac{4\pi n_1}{(n_1 - n_2)} * \left(\frac{k}{N} + m\right) \quad (2)$$

As previously discussed, $n_1$ is the refractive index of the anti-reflective microstructure layer 68, $n_2$ is the refractive index of the material or air immersing the anti-reflective microstructure layer 68, N is the total number of levels, and k is the particular level of the total number of levels N in which the reflection phase is being calculated for. The parameter m is the number of $2\pi$ phase rotations in transmission that is needed to satisfy equation 1. In other words, m is the number of phase rotations in transmission needed for the reflection phase of $R_2$ to be equal to, or at least approximately equal to, 0 or an integer multiple of $2\pi$. For example, assuming $n_1 = 1.6$, $n_2 = 1$, N=4, and k=1, the reflection phase of $R_2$ equals $24\pi$ and satisfies equation 1 when m=2.

Once m is determined, the transmission phase of T of the diffractive microstructure for the $k^{th}$ level may be determined using equation 3, as follows:

$$\phi_T = \frac{2\pi k}{N} + m * 2\pi \quad (3)$$

For example, assuming $n_1=1.6$, $n_2=1$, N=4, k=1, and m=2, the transmission phase of T equals $4.5\pi$, or $\pi/2+4\pi$, where $4\pi$ is equivalent to 0 in phase. The phase shift of the transmitted light is thus equivalent to a $\pi/2$-phase shift.

The height d of the $k^{th}$ level that provide destructive interference between R1 and R2 may then be determined for the target transmission wavelength $\lambda$ using equations 4 or 5, as follows:

$$d = \frac{\phi_T \lambda}{2\pi(n_1 - n_2)} \quad (4)$$

$$d = \frac{\phi_R \lambda}{4\pi n_1} \quad (5)$$

For example, assuming $\lambda=550$ nm, $n_1=1.6$, $n_2=1$, N=4, k=1, m=2, $\phi_T=4.5\pi$, $\phi_R=24\pi$, the height d equals 2062.5 nm. The height d is calculated for each of the levels N.

In the embodiment shown in FIG. 1A, there are two different diffractive layers (i.e., the first and second phase shift layers 16, 18), and similar calculations may therefore be performed to appropriately determine the height d (which may be referred to herein alternatively as the width) of each of the materials of the first and second phase shift layers 16, 18 in order to achieve anti-reflective properties and to transmit light having a desired phase shift or phase quantization.

FIGS. 2A through 2D are cross-sectional views illustrating various alternative embodiments of optical lenses, each having similar optical properties as discussed above with respect to the optical lens 10 shown in FIG. 1A. In particular, in each of the optical lenses illustrated in FIGS. 2A through 2D, four different phase quantizations may be obtained by transmission of light through the various material layers in the lenses.

Figure 2A:
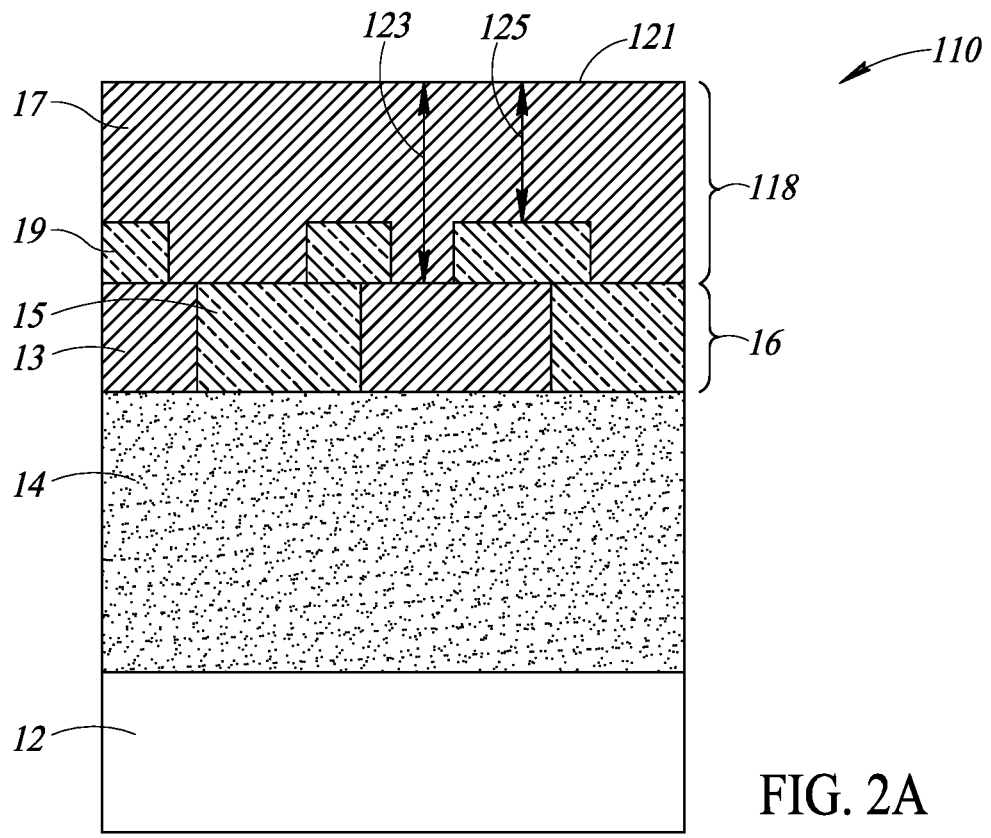
FIG. 2A is a cross-sectional view of an optical lens, in accordance with another embodiment of the present disclosure.

FIG. 2A is a cross-sectional view of an optical lens 110, in accordance with one or more embodiments of the present disclosure. The optical lens 110 is similar to the optical lens 10 shown in FIG. 1A in many respects, except for certain differences that will be discussed in further detail herein.

The optical lens 110 includes a substrate 12, a first immersion material layer 14, and a first phase shift layer 16, each of which are substantially the same as shown in the optical lens 10 of FIG. 1A. The second phase shift layer 218 of the optical lens 110, however, is different than the second phase shift layer 18 of the optical lens 10 of FIG. 1A. In particular, the second phase shift layer 218 includes segments of the fourth material 19 on the first phase shift layer 16. The third material 17 is also disposed on the first phase shift layer 16, e.g., extending between the segments of the fourth material 19. Moreover, the third material 17 is disposed on top of the segments of the fourth material 19, and extends to a height over the segments of the fourth material 19 and the first phase shift layer 16. The third material 17 may thus have two different heights: a first height 123 that extends from the upper surface of the first phase shift layer 16 to the upper surface 121 of the second phase shift layer 118, and a second height 125 that extends from an upper surface of a segment of the fourth material 19 in the second phase shift layer 118 to the upper surface 121 of the second phase shift layer 118.

Another difference with respect to the optical lens 10 of FIG. 1A is that the optical lens 110 of FIG. 2A does not include a second immersion material layer 20. Instead, the upper surface 121 of the second phase shift layer 118 may form an outer surface of the optical lens 110.

The first phase shift layer 16 is a π-phase shift layer, and the second phase shift layer 118 is a π/2-phase shift layer. The second phase shift layer 118 may impart a 0-phase shift, for example, on light that is transmitted through only the third material 17, e.g., in regions where the third material 17 has the first height 123 extending between the upper surface of the first phase shift layer 16 and the upper surface 121 of the second phase shift layer 118. Additionally, the second phase shift layer 118 may impart a π/2-phase shift, for example, on light that is transmitted through a segment of the fourth material 19 and a portion of the third material 17 that has a height 125 between the upper surface of the segment of the fourth material 19 and the upper surface 121 of the second phase shift layer 118.

Accordingly, similar to the optical lens 10 of FIG. 1A, the optical lens 110 transmits a received beam of light with four distinct phase quantizations. For example, a first phase quantization (e.g., a 0-phase shift) may be obtained via transmission of an incident light beam through a 0-phase shift portion of the first phase shift layer 16 (e.g., through the first material 17) and through a 0-phase shift portion of the second phase shift layer 118 (e.g., through a portion of the third material having the height 123). A second phase quantization (e.g., a π/2-phase shift) may be obtained via transmission of a light beam through a 0-phase shift portion of the first phase shift layer 16, and through a π/2-phase shift portion of the second phase shift layer 118 (e.g., through a segment of the fourth material 19 and a portion of the third material 17 that has the height 125). A third phase quantization (e.g., a π-phase shift) may be obtained via transmission of a light beam through a π-phase shift portion of the first phase shift layer 16 (e.g., through the second material 15), and through a 0-phase shift portion of the second phase shift layer 118. A fourth phase quantization (e.g., a 3π/2-phase shift) may be obtained via transmission of a light beam through a π-phase shift portion of the first phase shift layer 16, and through a π/2-phase shift portion of the second phase shift layer 118.

Figure 2B:
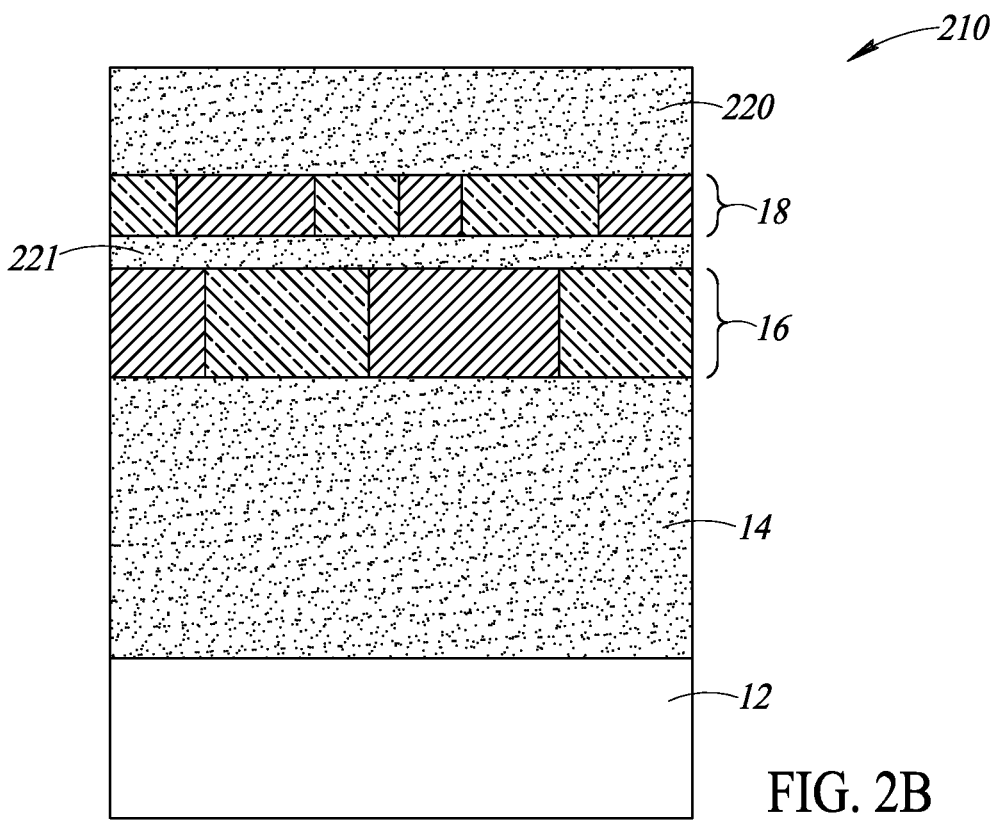
FIG. 2B is a cross-sectional view of an optical lens, in accordance with another embodiment of the present disclosure.

FIG. 2B is a cross-sectional view of an optical lens 210, in accordance with one or more embodiments of the present disclosure. The optical lens 210 is similar to the optical lens 10 shown in FIG. 1A in many respects, except for certain differences that will be discussed in further detail herein.

The main difference between the optical lens 210 of FIG. 2B and the optical lens 10 of FIG. 1A is that the optical lens 210 includes a third immersion material layer 221 between the first phase shift layer 16 and the second phase shift layer 18. Additionally, the optical lens 210 includes a second immersion material layer 220 that may be thinner than the second immersion material layer 20 of the optical lens 10. The second and third immersion material layers 220, 221 of the optical lens 210 may, in combination, have a same thickness as that of the second material layer 20 of the optical lens 10 shown in FIG. 1A.

The second and third immersion material layers 220, 221 may be oxide layers, and may be made of the same material as the first and second immersion material layers 14, 20 of the optical lens 10, for example, silicon dioxide.

The first phase shift layer 16 may be a π-phase shift layer, including the same materials as described above with respect to the optical lens 10 of FIG. 1A. Similarly, the second phase shift layer 18 may be a π/2-phase shift layer, including the same materials as described above with respect to the optical lens 10 of FIG. 1A.

Figure 2C:
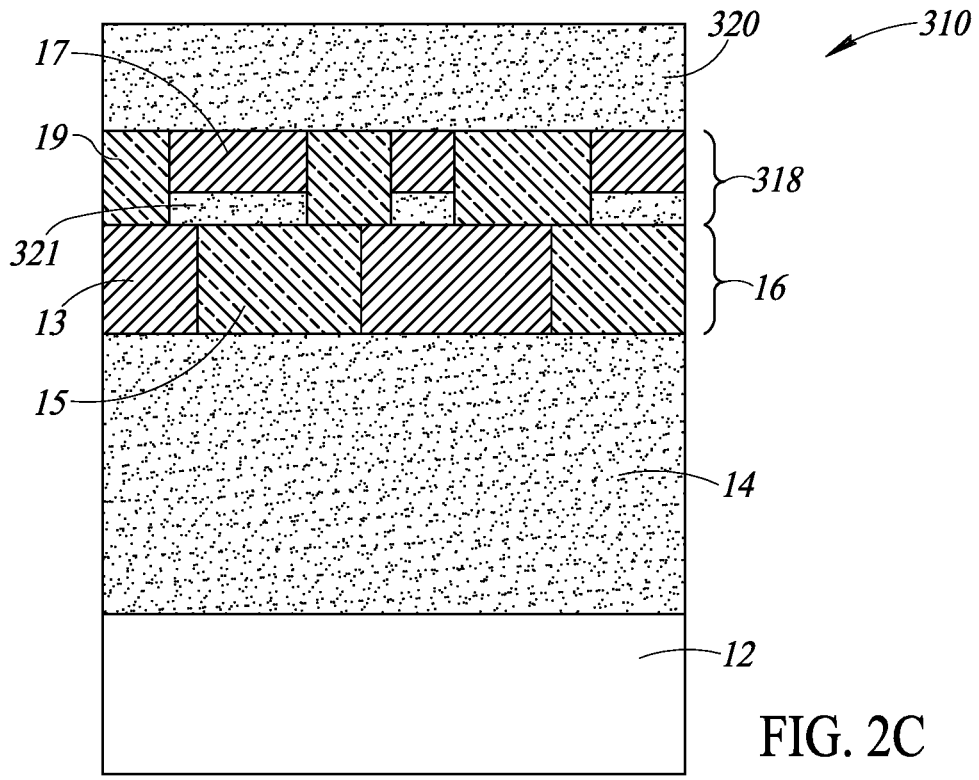
FIG. 2C is a cross-sectional view of an optical lens, in accordance with another embodiment of the present disclosure.

FIG. 2C is a cross-sectional view of an optical lens 310, in accordance with one or more embodiments of the present disclosure. The optical lens 310 is similar to the optical lens 10 shown in FIG. 1A, except for certain differences that will be discussed in further detail herein.

One of the main differences between the optical lens 310 of FIG. 2C and the optical lens 10 of FIG. 1A is that the optical lens 310 has a different second phase shift layer 318. Additionally, the optical lens 310 includes a second immersion material layer 320 that may be thinner than the second immersion material layer 20 of the optical lens 10.

The second phase shift layer 318 includes layers of the third material 17 and the fourth material 19, which may be the same materials as discussed herein with respect to the second phase shift layer 18 of the optical lens 10 shown in FIG. 1A. For example, the third material 17 may be silicon nitride, and the fourth material 19 may be silicon. Additionally, the second phase shift layer 318 includes a plurality of third immersion material layers 321 respectively positioned between the first phase shift layer 16 and the layers of the third material 17.

In the optical lens 310, the layers of the fourth material 19 in the second phase shift layer 318 may be thicker than the layers of the fourth material 19 in the second phase shift layer 18 of the optical lens 10 shown in FIG. 1A. Moreover, the layers of the third material 17 may extend from the surface of the respective third immersion material layers 321 to a height that is substantially equal to the height of the layers of the fourth material 19 in the second phase shift layer 318.

The second and third immersion material layers 320, 321 may be oxide layers, and may be made of the same material as the first and second immersion material layers 14, 20 of the optical lens 10, for example, silicon dioxide.

The first phase shift layer 16 may be a π-phase shift layer, including the same materials as described above with respect to the optical lens 10 of FIG. 1A. The second phase shift layer 318 may be a π/2-phase shift layer. Accordingly, similar to the optical lens 10 of FIG. 1A, the optical lens 310 imparts four distinct phase quantizations on a beam of light that is transmitted through the lens 310.

Figure 2D:
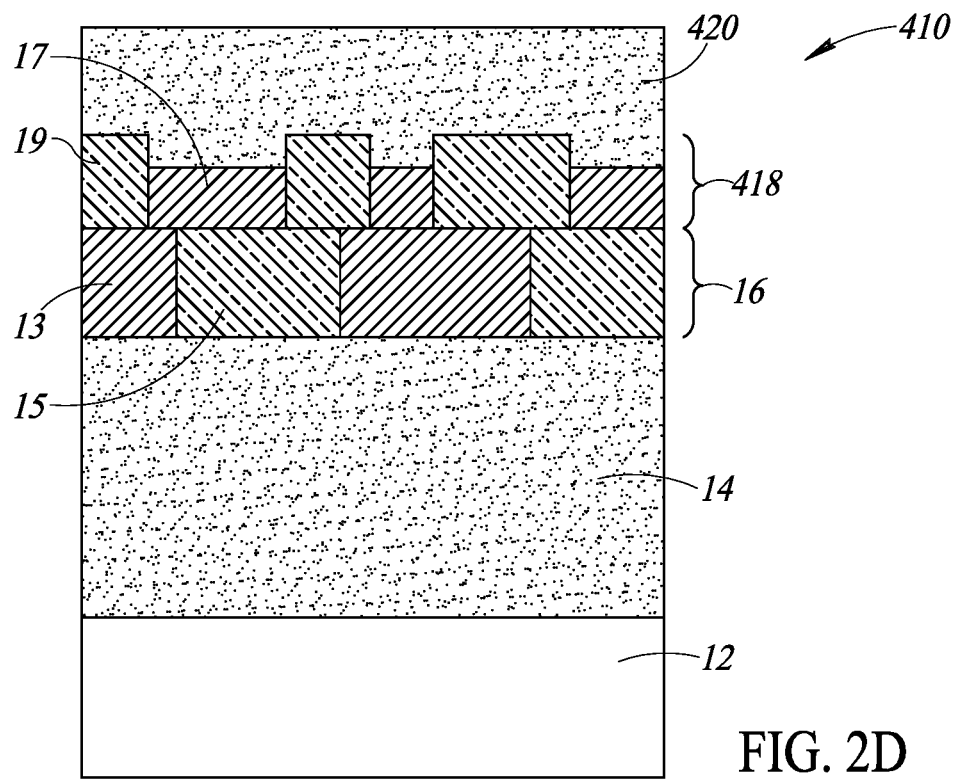
FIG. 2D is a cross-sectional view of an optical lens, in accordance with another embodiment of the present disclosure.

FIG. 2D is a cross-sectional view of yet another optical lens 410, in accordance with one or more embodiments of the present disclosure. The optical lens 410 is similar to the optical lens 310 shown in FIG. 2C, except that the optical lens 410 does not include third immersion material layers between the third material 17 and the first phase shift layer 18. Instead, the optical lens 410 includes a second immersion material layer 420 on the second phase shift layer 418.

The third and fourth materials 17, 19 of the second phase shift layer 418 have different thicknesses, with the fourth material 19 extending from the surface of the first phase shift layer 16 to a height that is greater than that of the third material 17. The second immersion material layer 420 includes portions 421 that extend between adjacent layers of the fourth material 19 and on the layers of the third material 17.

Figure 4:
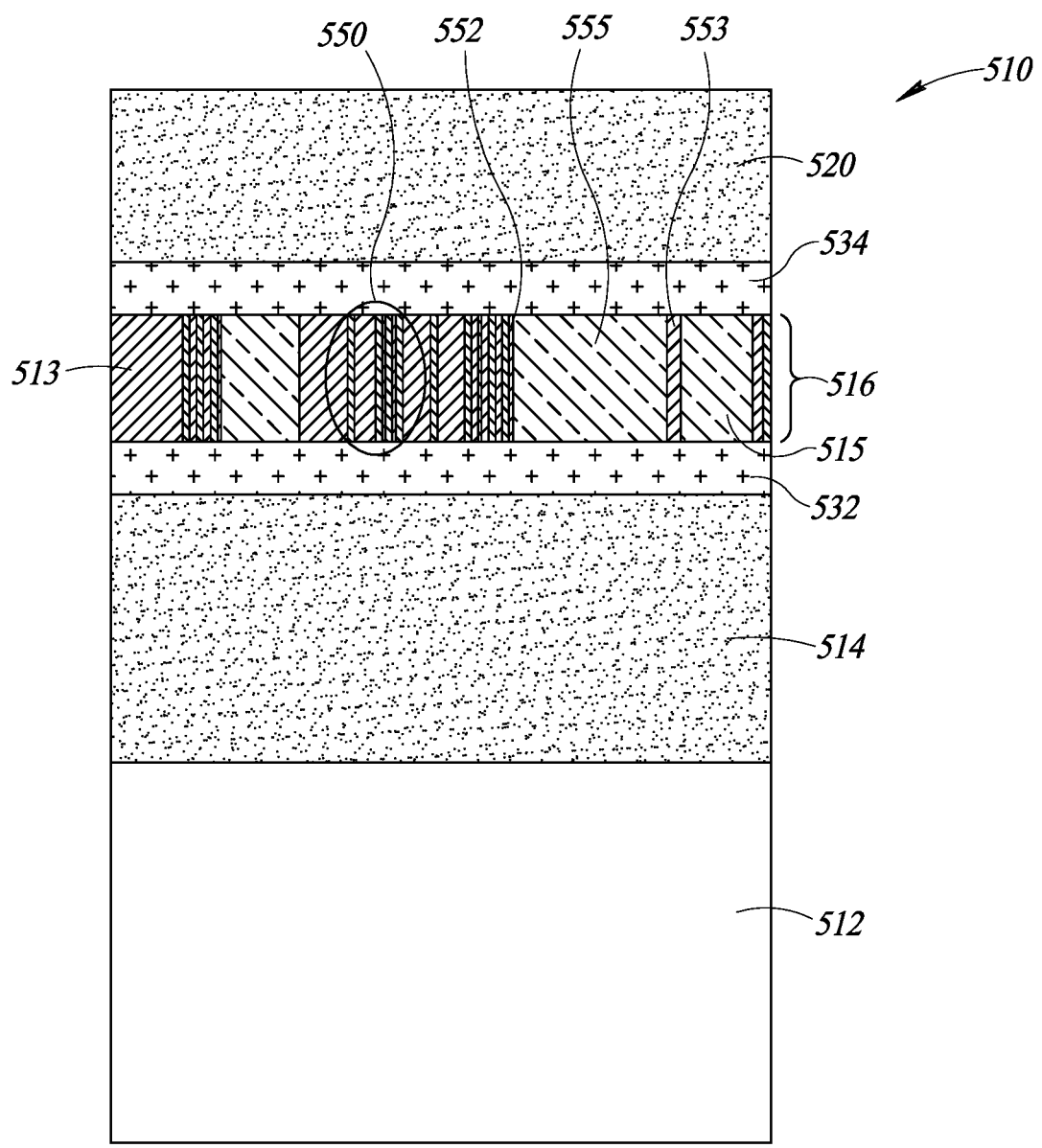
FIG. 4 is a cross-sectional view of an optical lens, in accordance with another embodiment of the present disclosure.

FIG. 4 is a cross-sectional view of an optical lens 510, in accordance with one or more embodiments of the present disclosure. The optical lens 510 includes a substrate 512, a first immersion material layer 514, a phase shift layer 516, first and second anti-reflective layers 532, 534, and a second immersion material layer 520.

In one or more embodiments, the substrate 512 may be a glass substrate. The first and second immersion material layers 514, 520 may be oxide layers, such as silicon dioxide ($SiO_2$) layers.

The phase shift layer 516 includes two or more different materials, each having a different refractive index, and the different materials thus impart different phase shifts to light that is transmitted through the phase shift layer 516. For example, the phase shift layer 516 may include a first material 513 that produces a 0-phase shift (i.e., no effective phase shift in the transmitted light), and a second material 515 that produces a π-phase shift. In some embodiments, the first material 513 of the phase shift layer 516 may be silicon nitride, and the second material 515 may be silicon. In some embodiments, the second material 515 of the phase shift layer 516 is amorphous silicon (a-Si).

The first and second materials 513, 515 are arranged alternately (e.g., along a width direction of the lens 510) in the phase shift layer 516, with the alternately arranged portions of the first and second materials 513, 515 having varying widths. In one or more embodiments, the portions of the first and second materials 513, 515 may have widths within a range from less than 10 nm to about 250 nm. For example, a portion 555 of the second material 515 may have a width of about 239 nm, and may be disposed between narrow portions 552, 553 of the first material 513 which have widths between about 10 nm and about 30 nm. Each of these portions 555, 552, 553 may have a same height, with different widths, were each portion extends between surfaces of the first and second anti-reflective layers 532, 534.

The phase shift layer 516 includes regions having an effective refractive index that is some combination of the refractive indices of the first and second materials 513, 515. For example, region 550 includes a plurality of narrow portions of the first and second materials 513, 515, each having a width between about 10 nm and about 50 nm. The alternating narrow portions of the first and second materials 513, 515 cause the region 550 to have an effective refractive index that is some combination of the refractive indices of the first and second materials 513, 515. Accordingly, the region 550 will impart a phase shift to light that corresponds to the mixed refractive index of the region 550.

The alternating structure of portions of the first and second materials 513, 515 having varying widths allows the phase shift layer 516 to be produced with a continuous diffractive profile. That is, the phase shift layer 516 is not limited to a particular number of phase quantizations that are imparted on light transmitted through the phase shift layer 516; instead, due to the variety of mixed refractive indices that may be produced by the alternating arrangement of narrow portions of the first and second materials 513, 515, the phase shift layer 516 may have a continuous diffractive profile that is capable of generating an unlimited number of phase quantizations in transmitted light. Moreover, this structure of the phase shift layer 516 results in improved diffraction efficiency The first and second anti-reflective layers 532, 534 are provided between the phase shift layer 516 and the first and second immersion material layers 514, 520, respectively. The anti-reflective layers 532, 534 may be any material having an anti-reflection property that may be centered on a desired transmission wavelength. Anti-reflective layers or coatings provide destructive interference of reflections in thin films where a thickness of the film (e.g., a thickness of the phase shift layer 516) is less than or equal to a wavelength of the light. The anti-reflective layers 532, 534 promote transmission through, for example, silicon nitride in oxide and through silicon or amorphous silicon in oxide, as well as any other materials that may be included in the optical path of light through the optical lens 510. The anti-reflective layers 532, 534 may be broadband anti-reflective layers which promote transmission of light having a wide range of wavelengths.

In many of the embodiments described herein, the phase shift layers are sized and shaped to provide destructive interference for reflections while also modulating light that propagates through the phase shift layers by diffraction. Accordingly, in such embodiments, an additional anti-reflection layer or coating is not needed in order to reduce or eliminate reflected light as light is transmitted through the phase shift layers. However, in the optical lens 510 shown in FIG. 4, due to the continuous diffractive profile of the phase shift layer 516, it may be particularly difficult to avoid reflections without including the first and second anti-reflective layers 532, 534.

In some embodiments, the phase shift layer 516 may include a plurality of unit cells of a material, such as silicon, having a varying density in a width direction of the unit cells. For example, the phase shift layer 516 may include a plurality of successively arranged unit cells of silicon, with each of the unit cells having a width of about 200 nm. Each of the unit cells have a varying density of silicon, which causes the unit cells to have a diffractive profile that varies continuously along the width direction.

Figure 5:
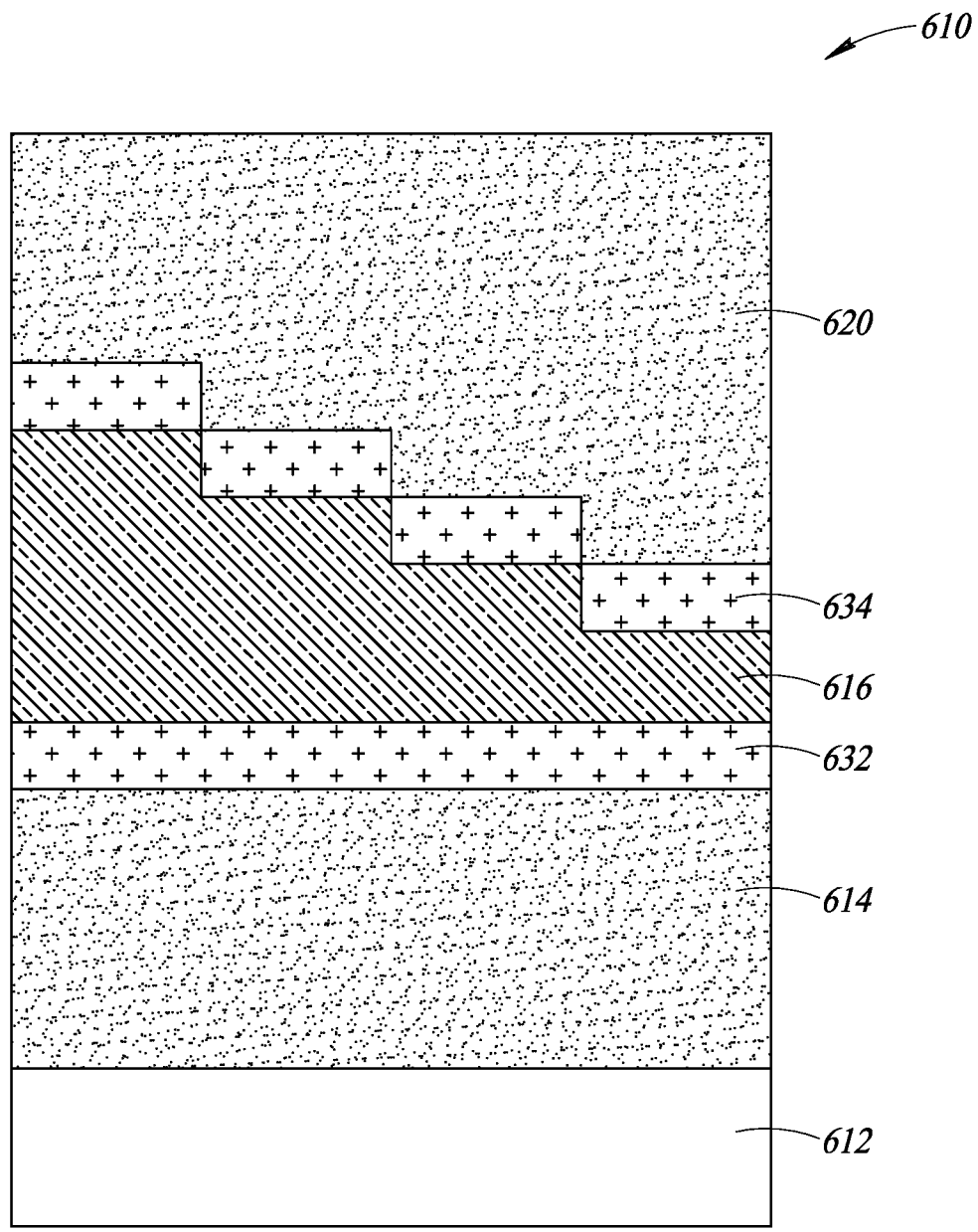
FIG. 5 is a cross-sectional view of an optical lens, in accordance with another embodiment of the present disclosure.

FIG. 5 is a cross-sectional view of an optical lens 610, in accordance with one or more embodiments of the present disclosure. The optical lens 610 includes a substrate 612, a first immersion material layer 614, a stepped phase shift layer 616, first and second anti-reflective layers 632, 634, and a second immersion material layer 620.

The anti-reflective layers 632, 634 remove interface reflections, i.e., reflections from interfaces between one or more materials in the optical path of light transmitted through the lens 610. Accordingly, the stepped phase shift layer 616 may be designed with any thickness or height, as the thickness of the material of the phase shift layer 616 does not need to be designed to be anti-reflective. Instead, the stepped phase shift layer 616 may be designed to have the desired phase shift properties without regard to reflective properties, since reflections will be canceled or otherwise reduced by the anti-reflective layers 632, 634. The phase shift layer 616 has a stepped structure, with varying thicknesses between the first and second anti-reflective layers 632, 634. Each of the different thicknesses of the phase shift layer 616 imparts a particular, and different, phase shift on light that is transmitted through the optical lens 610. The first and second immersion material layers 614, 620 may be silicon dioxide ($SiO_2$), as immersing the phase shift layer 616 in $SiO_2$ can reduce the aspect ratio of the phase shift layer 616.

Figure 6:
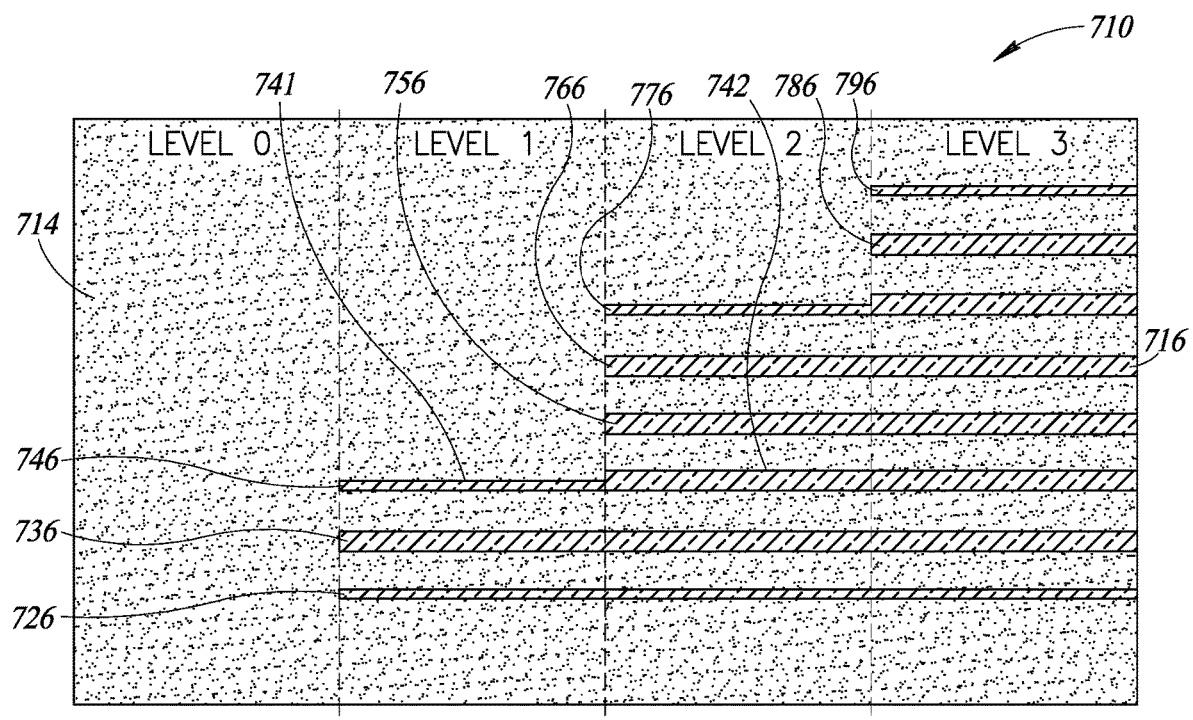
FIG. 6 is a cross-sectional view of an optical lens, in accordance with another embodiment of the present disclosure.

FIG. 6 is a cross-sectional view of an optical lens 710, in accordance with one or more embodiments of the present disclosure. The optical lens 710 includes a plurality of an immersion material 714, and a plurality of phase shift layers 716 that are immersed in or surrounded by the immersion material 714. The optical lens 710 may include or otherwise be formed on a substrate (not shown) as previously described herein with respect to one or more embodiments, and the substrate may be a glass substrate. The immersion material 714 has opposing first and second surfaces (e.g., lower and upper surfaces, as shown in FIG. 6), and the plurality of phase shift layers 716 are positioned between the surfaces of the immersion material 714, with portions of the immersion material 714 extending between adjacent phase shift layers 716. That is, the plurality of phase shift layers 716 may be embedded in the immersion material 714.

The phase shift layers 716 may be formed of any material capable of imparting a phase shift to light that is transmitted through the optical lens 710. For example, in some embodiments, the phase shift layers 716 may be silicon or amorphous silicon layers. The immersion material 714 may be $SiO_2$. The plurality of phase shift layers 716 may include any number of separate phase shift layers. For example, in the embodiment shown in FIG. 6, the optical lens 710 includes a first phase shift layer 726, a second phase shift layer 736, a third phase shift layer 746, a fourth phase shift layer 756, a fifth phase shift layer 766, a sixth phase shift layer 776, a seventh phase shift layer 786, and an eighth phase shift layer 796, each of which may be referred to herein as a phase shift layer 716.

The optical lens 710 may have a multi-layer stack structure, with the plurality of phase shift layers 716 being separated from one another (e.g., in a thickness direction) by respective portions of the immersion material 714. The phase shift layers 716 may have various different thicknesses. For example, as shown in FIG. 6, the first phase shift layer 726 may have a thickness that is less than a thickness of a second phase shift layer 736.

In some embodiments, each of the phase shift layers 716 may have one or more thicknesses that is an integer multiple of a first thickness. For example, the first phase shift layer 726 may have a thickness of about 20 nm, while the second phase shift layer 736 may have a thickness of about 40 nm. One or more of the phase shift layers 716 may have portions of a first thickness, and portions of a second thickness. For example, the third phase shift layer 746 may include a first portion 741 having a first thickness and a second portion 742 having a second thickness. The first thickness may be, for example, 20 nm, while the second thickness may be, for example, 40 nm.

The immersion material 714 may have a consistent or same thickness between neighboring phase shift layers 716. In some embodiments, the immersion material 714 has a thickness of about 88 nm between neighboring phase shift layers 716.

The optical lens 710 includes a plurality of phase shift regions, e.g., level 0 through level 3, each of which imparts a particular phase shift or phase quantization to light that is transmitted through the optical lens 710. Each of the phase shift layers 716 extends across (e.g., in a width direction) at least one of the phase shift regions. Moreover, at least some of the phase shift layers 716 may include different thicknesses in different phase shift regions. For example, the third phase shift layer 746 includes the first portion 741 having a first thickness in the Level 1 phase shift region and a second portion 742 having a second thickness in the Levels 2 and 3 phase shift regions.

The different phase quantizations are obtained due to the multi-layer stack structure of the phase shift layers 716 corresponding to the various regions. For example, the level 0 region of the optical lens 710 may contain only the immersion material 714, and may impart a 0-phase shift (i.e., no effective phase shift) to light that is transmitted through the level 0 phase shift region. Accordingly, a first phase quantization (i.e., light having a 0-phase shift) may be obtained via transmission of a light beam through the level 0 phase shift region of the optical lens 710.

The level 1 region of the optical lens 710 includes one or more portions of the plurality of phase shift layers 716, with each of such portions of the plurality of phase shift layers 716 being sandwiched between portions of the immersion material 714. For example, the level 1 region may include a portion of the first phase shift layer 726, a portion of the second phase shift layer 736, and may further include the portion 741 of the third phase shift layer 746. The first and second phase shift layers 726, 736 are separated from one another in the level 1 phase shift region by a portion of the immersion material 714, and the second and third phase shift layers 736, 746 are separated from one another in the level 1 phase shift region by another portion of the immersion material 714.

The optical properties of the phase shift layers 716 in the level 1 phase shift region, such as the refractive index, dimensions (e.g., the thickness of each of the layers), and the like may be selected and/or designed to impart a particular phase shift, as well as to provide anti-reflective properties, as described above for example with respect to FIG. 3. In one or more embodiments, the level 1 phase shift region may $\pi/2$-phase shift region, which imparts a $\pi/2$-phase shift to light that is transmitted through the level 1 phase shift region. Accordingly, a second phase quantization (i.e., light having a $\pi/2$-phase shift) may be obtained via transmission of a light beam through the level 1 phase shift region of the optical lens 710.

Similarly, the level 2 phase shift region of the optical lens 710 includes one or more portions of the plurality of phase shift layers 716, with each of the portions of the plurality of phase shift layers 716 being sandwiched between portions of the immersion material 714. As shown in FIG. 6, the level 2 phase shift region may include portions of the first through sixth phase shift layers 726, 736, 746, 756, 766, and 776. Each of the neighboring first through sixth phase shift layers are separated from one another in the level 2 phase shift region by respective portions of the immersion material 714.

As described above with respect to the level 1 phase shift region, the optical properties of the phase shift layers 716 in the level 2 phase shift region may similarly be selected and/or designed to impart a particular phase shift, as well as to provide anti-reflective properties, as described above for example with respect to FIG. 3. In one or more embodiments, the level 2 phase shift region may $\pi$-phase shift region, which imparts a $\pi$-phase shift to light that is transmitted through the level 2 phase shift region. Accordingly, a third phase quantization (i.e., light having a $\pi$-phase shift) may be obtained via transmission of a light beam through the level 2 phase shift region of the optical lens 710.

The level 3 phase shift region of the optical lens 710 similarly includes one or more portions of the plurality of phase shift layers 716, with each of the portions of the plurality of phase shift layers 716 being sandwiched between portions of the immersion material 714. As shown in FIG. 6, the level 3 phase shift region may include portions of each of the first through eighth phase shift layers 726, 736, 746, 756, 766, 776, 786, and 796. Each of the neighboring first through eighth phase shift layers are separated from one another in the level 3 phase shift region by respective portions of the immersion material 714.

As described above with respect to the level 1 and level 2 phase shift regions, the optical properties of the phase shift layers 716 in the level 3 phase shift region may similarly be selected and/or designed to impart a particular phase shift, as well as to provide anti-reflective properties, as described above for example with respect to FIG. 3. In one or more embodiments, the level 3 phase shift region may 3π/2-phase shift region, which imparts a 3π/2-phase shift to light that is transmitted through the level 3 phase shift region. Accordingly, a fourth phase quantization (i.e., light having a 3π/2-phase shift) may be obtained via transmission of a light beam through the level 3 phase shift region of the optical lens 710.

Although the optical lens 710 is illustrated in FIG. 6 as having four distinct phase shift regions, which transmit light having four distinct phase quantizations, it should be readily appreciated that the optical lens 710 may have any number of distinct phase shift regions, each of which is configured to transmit light with a distinct phase shift, and each of which may be designed to have anti-reflective properties as described herein. The multi-layer stack structure shown in FIG. 6 is a scalable structure, such that optical lenses having many different phase shift regions may be produced by forming phase shift layers 716 spanning a selected number of phase shift regions, and by forming the immersion material 714 over each of the phase shift layers 716.

Figure 7A:
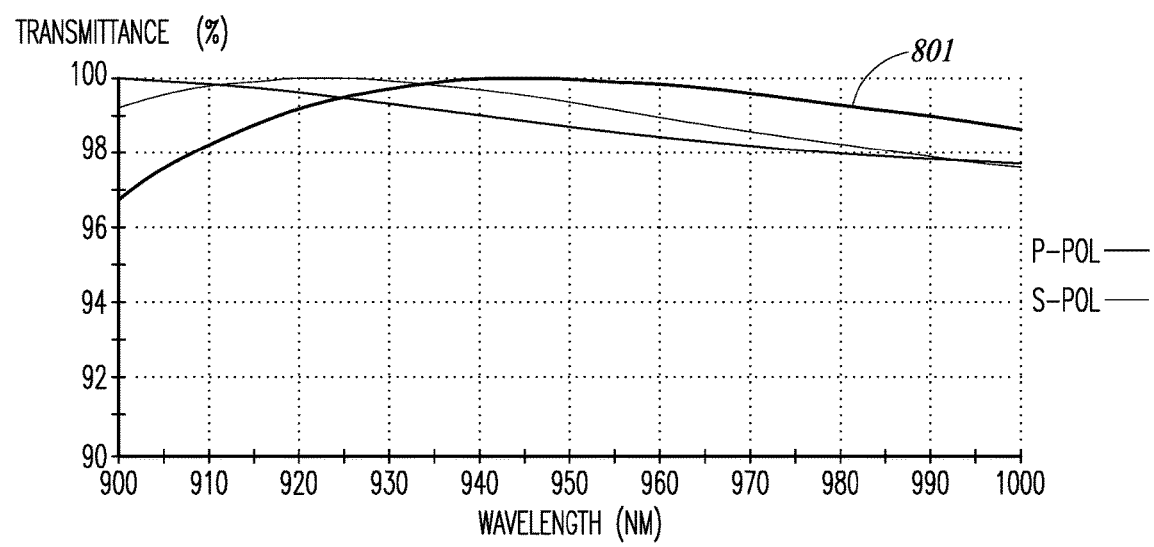
FIGS. 7A through 7C are plots illustrating the transmittance percentage of light that is transmitted through each of the level 1, level 2, and level 3 phase shift regions, respectively, of the optical lens shown in FIG. 6.
Figure 7B:
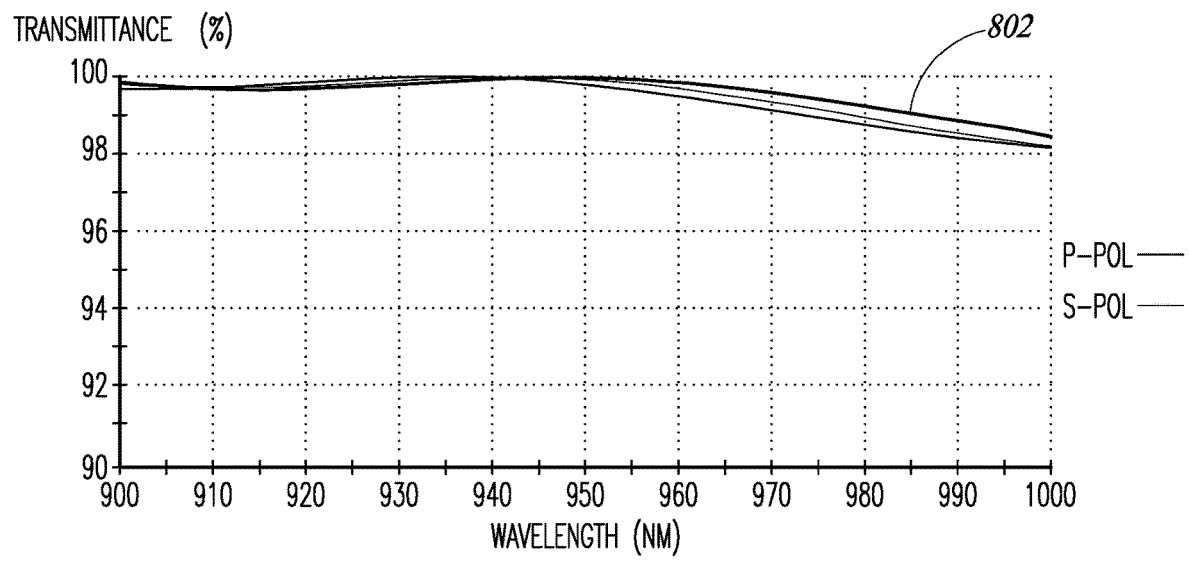
Figure 7C:
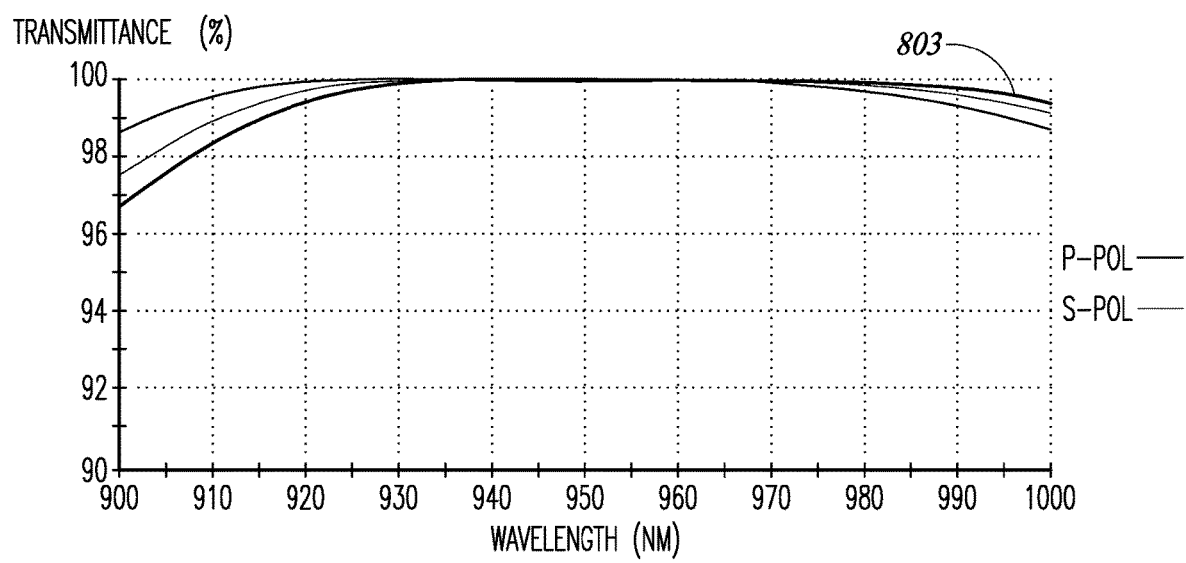

FIGS. 7A through 7C are plots illustrating the transmittance percentage of light that is transmitted through each of the level 1, level 2, and level 3 phase shift regions, respectively, of the optical lens 710 shown in FIG. 6.

In FIG. 7A, the darkest line 801 represents the transmittance percentage of light that is incident on the optical lens 710 at an angle perpendicular to a surface of the optical lens 710. That is, the line 801 represents the on-axis illumination of light on the optical lens 710. As can be seen from FIG. 7A, the on-axis light is transmitted at greater than 96% over a range of wavelengths between 900 nm and 1000 nm. At a target wavelength of 940 nm, the on-axis transmittance is about 100%, which is a very good result.

Also shown in FIG. 7A are the p-polarized (medium darkness) and s-polarized (lightest) components of light that is transmitted through the level 1 phase shift region of the optical lens 710 when the light source is tiled at 10° from the on-axis orientation. At the target wavelength of 940 nm, both the p- and s-polarized components of light are transmitted through the level 1 phase shift region with a transmittance percentage greater than about 98%.

FIG. 7B represents the transmittance of light through the level 2 phase shift region of the optical lens 710. As can be seen from FIG. 7B, the on-axis light (shown as line 802) is transmitted at greater than 98% over the range of wavelengths between 900 nm and 1000 nm. At the target wavelength of 940 nm, the on-axis transmittance is about 100%. Also shown in FIG. 7B are the p-polarized (medium darkness) and s-polarized (lightest) components of light that is transmitted through the level 2 phase shift region of the optical lens 710 when the light source is tiled at 10° from the on-axis orientation. At the target wavelength of 940 nm, both the p- and s-polarized components of light are transmitted through the level 2 phase shift region with 100% transmittance.

FIG. 7C represents the transmittance of light through the level 3 phase shift region of the optical lens 710. As can be seen from FIG. 7C, the on-axis light (shown as line 803) is transmitted at greater than 96% over the range of wavelengths between 900 nm and 1000 nm. At the target wavelength of 940 nm, the on-axis transmittance is about 100%. Also shown in FIG. 7C are the p-polarized (medium darkness) and s-polarized (lightest) components of light that is transmitted through the level 3 phase shift region of the optical lens 710 when the light source is tiled at 10° from the on-axis orientation. At the target wavelength of 940 nm, both the p- and s-polarized components of light are transmitted through the level 3 phase shift region with 100% transmittance.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lens, comprising:
   a substrate;
   a first immersion material layer on the substrate; and
   a plurality of anti-reflective phase shift layers on the first immersion material layer, the phase shift layers defining:
      a first anti-reflective phase shift region configured to transmit received light without a phase shift;
      a second anti-reflective phase shift region configured to transmit the received light with a first phase shift;
      a third anti-reflective phase shift region configured to transmit the received light with a second phase shift; and
      a fourth anti-reflective phase shift region configured to transmit the received light with a third phase shift, the first, second, and third phase shifts being different from one another.

2. The lens of claim 1 wherein the first phase shift is a π/2-phase shift, the second phase shift is a π-phase shift, and the third phase shift is a 3π/2-phase shift.

3. The lens of claim 1 wherein the plurality of anti-reflective phase shift layers includes:
   a first anti-reflective phase shift layer including regions of a first material respectively abutting regions of a second material; and
   a second anti-reflective phase shift layer on the first anti-reflective phase shift layer, the second anti-reflective phase shift layer including regions of a third material respectively abutting regions of a fourth material,
   wherein the first and third materials are configured to transmit the received light without a phase shift, the second material is configured to transmit the received light with a π-phase shift, and the fourth material is configured to transmit the received light with a π/2-phase shift.

4. The lens of claim 3 wherein the first and third materials are a same material, and the second and fourth materials are a same material.

5. The lens of claim 4 wherein the first and third materials are silicon nitride, and the second and fourth materials are silicon.

6. The lens of claim 5 wherein the second and fourth materials are amorphous silicon.

7. The lens of claim 3, further comprising:
a second immersion material layer between the first and second anti-reflective phase shift layers; and
a third immersion material layer on the second anti-reflective phase shift layer.

8. The lens of claim 7 wherein the first, second, and third immersion material layers are $SiO_2$ layers.

9. The lens of claim 3 wherein the third material of the second anti-reflective phase shift layer is disposed on and between the regions of the fourth material.

10. The lens of claim 3, further comprising:
a second immersion material layer between the first anti-reflective phase shift layer and the regions of the third material; and
a third immersion material layer on the second anti-reflective phase shift layer.

11. The lens of claim 3 wherein the regions of the third material extend to a first height from a surface of the first anti-reflective phase shift layer, and the regions of the fourth material extend to a second height from the surface of the first anti-reflective phase shift layer, the first height being greater than the second height.

12. The lens of claim 1 wherein the first immersion material layer has a first surface and a second surface opposite to the first surface, the plurality of anti-reflective phase shift layers being positioned between the first and second surfaces of the first immersion material layer, and the first immersion material layer extends between adjacent ones of the plurality of anti-reflective phase shift layers.

13. A lens, comprising:
an immersion material layer having opposite first and second surfaces; and
a plurality of separate anti-reflective phase shift layers embedded in the immersion material layer between the first and second surfaces, the anti-reflective phase shift layers being spaced apart from one another by portions of the immersion material layer extending between adjacent ones of the plurality of anti-reflective phase shift layers, the lens including:
a first anti-reflective phase shift region configured to transmit received light without a phase shift;
a second anti-reflective phase shift region configured to transmit the received light with a first phase shift;
a third anti-reflective phase shift region configured to transmit the received light with a second phase shift; and
a fourth anti-reflective phase shift region configured to transmit the received light with a third phase shift, the first, second, third, and fourth phase shifts being different from one another.

14. The lens of claim 13 wherein the first anti-reflective phase shift region includes only the immersion material layer, the second anti-reflective phase shift region includes a first portion of the plurality of anti-reflective phase shift layers, the third anti-reflective phase shift region includes the first portion and a second portion of the plurality of anti-reflective phase shift layers, and the fourth anti-reflective phase shift region includes the first, second, and a third portion of the plurality of anti-reflective phase shift layers.

15. The lens of claim 13 wherein each of the portions of the immersion material layer extending between adjacent ones of the plurality of anti-reflective phase shift layers have a same thickness.

16. The lens of claim 13 wherein at least one of the anti-reflective phase shift layers has a first thickness in one of the second through fourth anti-reflective phase shift regions, and a second thickness in another one of the second through fourth anti-reflective phase shift regions, the first thickness being different than the second thickness.

17. The lens of claim 16 wherein the first thickness is about 40 nm, and the second thickness is about 20 nm.

18. The lens of claim 13 wherein the immersion material comprises $SiO_2$ and each of the plurality of anti-reflective phase shift layers comprises amorphous silicon.

* * * * *